(12) United States Patent
Nuessle et al.

(10) Patent No.: US 7,392,182 B2
(45) Date of Patent: Jun. 24, 2008

(54) SPEECH RECOGNITION SYSTEM

(75) Inventors: Gerhard Nuessle, Blaustein (DE);
Harald Bernd Enderle,
Baden-Wurttemberg (DE); Franz S. Gerl, Bayern (DE)

(73) Assignee: Harman International Industries, Inc., Northridge, CA (US)

( * ) Notice: Subject to any disclaimer, the term of this patent is extended or adjusted under 35 U.S.C. 154(b) by 1089 days.

(21) Appl. No.: 10/324,737

(22) Filed: Dec. 18, 2002

(65) Prior Publication Data

US 2004/0122670 A1 Jun. 24, 2004

(51) Int. Cl.
G10L 15/00 (2006.01)
G10L 15/04 (2006.01)

(52) U.S. Cl. .......................... 704/231; 704/251
(58) Field of Classification Search .................. 704/231, 704/251
See application file for complete search history.

(56) References Cited

U.S. PATENT DOCUMENTS

| | | | |
|---|---|---|---|
| 4,866,778 A | | 9/1989 | Baker |
| 5,027,406 A | * | 6/1991 | Roberts et al. .............. 704/244 |
| 5,454,062 A | * | 9/1995 | La Rue ....................... 704/254 |
| 5,680,511 A | * | 10/1997 | Baker et al. ................ 704/257 |
| 5,752,230 A | * | 5/1998 | Alonso-Cedo .............. 704/270 |
| 5,799,267 A | * | 8/1998 | Siegel ........................... 704/1 |
| 5,920,837 A | * | 7/1999 | Gould et al. ................. 704/251 |
| 5,937,380 A | * | 8/1999 | Segan .......................... 704/235 |
| 5,995,928 A | * | 11/1999 | Nguyen et al. .............. 704/251 |
| 6,092,044 A | * | 7/2000 | Baker et al. ................. 704/254 |
| 6,108,631 A | | 8/2000 | Rühl |
| 6,230,132 B1 | | 5/2001 | Class et al. |
| 6,721,702 B2 | * | 4/2004 | Schneider ................... 704/251 |
| 6,990,445 B2 | * | 1/2006 | Ky .............................. 704/235 |
| 2002/0128831 A1 | * | 9/2002 | Ju et al. ....................... 704/231 |
| 2002/0138265 A1 | * | 9/2002 | Stevens et al. .............. 704/251 |
| 2003/0167166 A1 | * | 9/2003 | Mann .......................... 704/231 |

FOREIGN PATENT DOCUMENTS

| | | | | |
|---|---|---|---|---|
| DE | 197 09 518 C1 | | 3/1998 | |
| DE | 198 13 605 A1 | | 9/1999 | |
| DE | WO0205263 | * | 1/2002 | ................ 704/231 |
| DE | 101 29 005 A1 | | 1/2003 | |
| EP | 0961 263 A2 | | 12/1998 | |
| EP | 0 905 662 A2 | | 3/1999 | |
| EP | 0 945 705 A2 | | 9/1999 | |
| WO | WO 99/00790 | | 1/1999 | |
| WO | WO 01/18793 A1 | | 3/2001 | |
| WO | WO 02/103678 A1 | | 12/2002 | |

* cited by examiner

*Primary Examiner*—Tālivaldis Ivars Šmits
*Assistant Examiner*—Lamont Spooner
(74) *Attorney, Agent, or Firm*—Brinks Hofer Gilson & Lione

(57) ABSTRACT

A speech recognition system processes speech outputs from a user to select a list element from a list of list elements. The user speaks the speech output as a whole word and an initial character sequence of the desired list element. The whole word and individual character sequence components are processed separately. A sublist is generated in response to the individual character sequence. A list element is selected in response to the whole word and sublist.

26 Claims, 2 Drawing Sheets

SPEECH RECOGNITION SYSTEM

BACKGROUND OF THE INVENTION

1. Technical Field

This invention relates to speech recognition systems. More particularly, this invention relates to speech recognition systems for a user to select a list element from a list or group of list elements.

2. Related Art

Many electronic applications have design processes or sequences that are speech-guided or speech-controlled by a user. The electronic applications include destination guidance (navigation) systems for vehicles, telephone and/or address systems, and the like. Vehicles include automobiles, trucks, boats, airplanes, and the like.

In these processes or sequences, a user provides speech output to a speech recognition unit. The speech output often corresponds to a list element from a list or group of list elements. The speech recognition unit processes the speech output. The speech recognition unit selects a list element in response to the processed speech output.

Speech recognition units typically process a limited number of speech outputs. Many speech recognition units can process only a few thousand words (speech outputs) or list elements. When there are large numbers of list elements, the speech recognition unit may not function or may not function properly without additional conditioning or processing of the speech output. Many applications have an extensive number of list elements, especially when the list comprises most or all of the available list elements. Such applications include destination guidance (navigation) systems and telephone systems. Navigation and telephone systems typically include numerous city and street names. Telephone systems typically include numerous personal names. These applications may have lists with list elements numbering in the tens to hundreds of thousands. In addition, many speech recognition units may not differentiate between similar sounding list elements, especially when there are numerous list elements that sound alike.

SUMMARY

This invention provides a speech recognition system for processing speech outputs from a user to select a list element from a list or group of list elements. The user speaks or states the speech output in chronologically successive voice inputs—a whole word and an initial character sequence of the desired list element. The speech output is separated into two components—the whole word and the individual character sequence. These components or voice inputs are processed separately. A sublist is generated in response to the individual character sequence. The whole word is compared to the sublist. A list element is selected in response to the whole word and sublist.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION OF THE PREFERRED EMBODIMENTS

Figure 1:
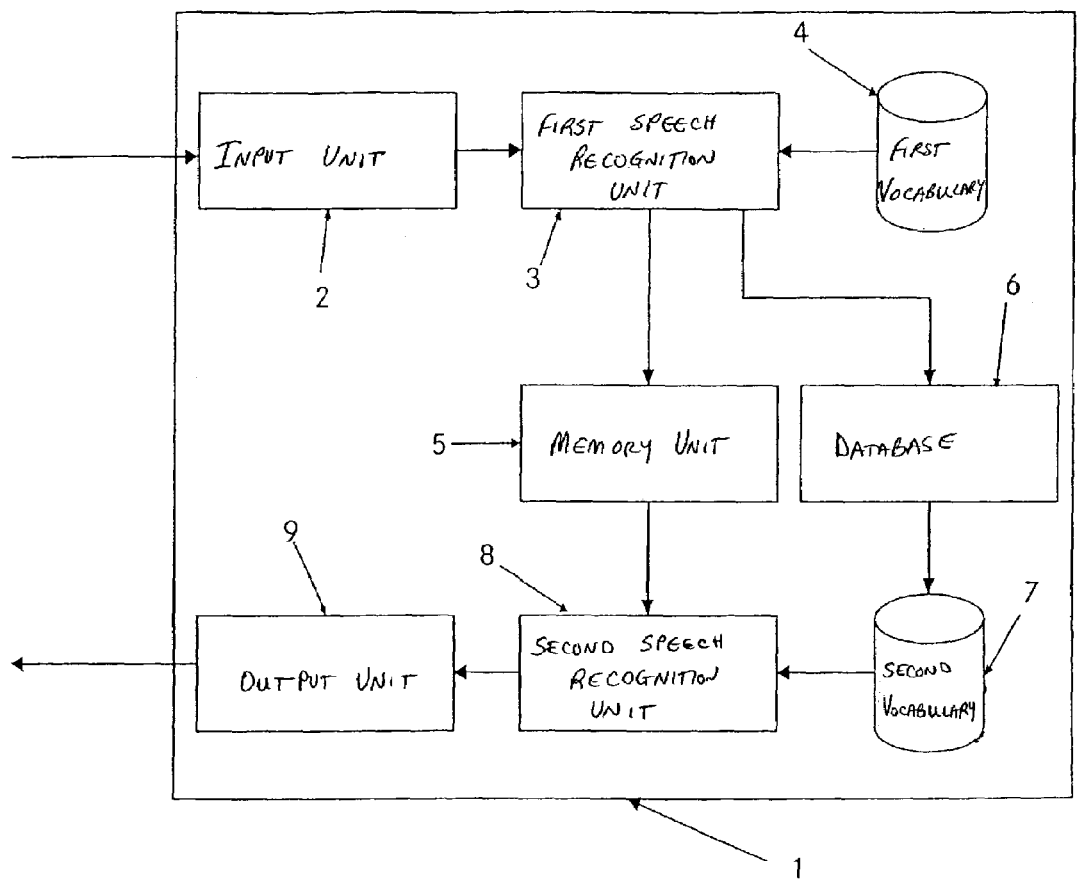
FIG. 1 represents a block diagram or flow chart of a speech recognition system.

FIG. 1 represents a block diagram or flow chart of a speech recognition system 1, which may be implemented in an electrical device (not shown) such as a navigation system for a vehicle, a telephone system, or the like. The speech recognition system 1 includes an input unit 2, a first speech recognition unit 3, a first vocabulary 4, a memory unit 5, a database 6, a second vocabulary 7, a second speech recognition unit 8, and an output unit 9. The input unit 2 may be a microphone or similar device. The first and second speech recognition units 3 and 8 may be implemented by one or more microprocessors or similar devices. The first vocabulary 4, memory unit 5, database 6, and second vocabulary 7 may be implemented by one or more memory devices. The output unit 9 may be a speaker, display unit, combination thereof, or the like. The speech recognition system 1 may be implemented on a digital signal processing (DSP) or other integrated circuit (IC) chip. The speech recognition system 1 may be implemented separately or with other electrical circuitry in the electrical device. While a particular configuration is shown, the speech recognition system 1 may have other configurations including those with fewer or additional components.

The speech recognition system 1 processes speech or voice outputs from a user to select a list element from a list or group of list elements. The list could be any assembly of data, related or unrelated. The list elements are particular data entries in list. The list may contain navigation data for a navigation system or contact data for a telephone system. The navigation data may include place names and street names as list elements. The contact data may include personal names, place names, street names, and telephone numbers as list elements. The list may contain other data.

To select a list element, the user states, speaks or otherwise provides a speech or voice output to the input unit 2. The speech output is an entire description of the desired list element and includes two voice inputs—a whole word and an initial character sequence of the desired list element. The whole word is the entire list element as spoken. The initial character sequence is one or more characters of the desired list element as successive individual characters. If "STUTTGART" were a list element, the whole word voice input would be "Stuttgart" as spoken. The initial character sequence voice input would be "S" for a character sequence having one character. The initial character sequence would be "S T U T" for a character sequence having four characters. The number of characters in the initial character sequence may be specified in response to the number of list elements in the list and the respective capacities of the speech recognition system and/or the speech recognition unit.

The user may speak the two voice inputs—whole word and initial character sequence—one immediately after the other or with a slight pause between them as in two steps separated by time. The sequence of the two voice inputs may be permanently specified by the speech recognition system 1. The sequence of the two voice inputs may be specified in a manner that allows them to be selected by the user. The speech recognition system may be configured such that the whole word voice input is spoken first followed by the initial character sequence voice input. In this configuration, it is convenient for the user to speak the initial character sequence, while the word just spoken is still present in his memory.

The speech recognition unit 3 receives the speech output from the input unit 2. The speech output may be processed acoustically in the speech recognition unit 3 to reduce or eliminate disturbing environmental noises. The speech recognition unit 3 separates the speech output into the two voice inputs or components—whole word and initial character sequence. The speech recognition unit 3 may use a separating procedure such as a word-spotting to determine the portion of the speech output corresponding to the whole word voice input and the portion of the speech output associated with the initial character sequence voice input. The separated components—whole word and initial character sequence—are processed separately. The portion of the speech output associated with the whole word voice input is stored in memory unit 5. The portion of the speech output associated with the initial character sequence is provided to the database 6.

The speech recognition unit 3 is connected to a vocabulary 4 having relevant characters (letters, digits, and the like) corresponding to the list elements in the list. The vocabulary also has model sequences not contained in the relevant characters that represent out-of-vocabulary words. These model sequences are much more likely assigned to the whole word input-than the individual characters. In connection the out-of-vocabulary model sequence and the character vocabulary may serve to separate the whole word from the individual character sequence. The first or recognition vocabulary 4 depends on the alphabet of the respective local language and/or the application of the speech recognition system. The individual character sequence contained in the speech output may be converted into a character sequence of written individual characters.

Database 6 holds the list or group of list elements. Database 6 may hold a whole, entire, or an extensive list having any number of list elements. The components of the speech recognition system 1 are configured for use with any type of data as the list elements. The list of list elements may be installed on the database 6 during manufacture and/or during subsequent operation of the electrical device that has the speech recognition system 1. The list may be downloaded from a flash memory or similar device. The list also may be downloaded via a communication system such as a landline and wireless radio networks, a global satellite network, and the like.

The database 6 performs a matching procedure on the portion of the speech output associated with the individual character sequence. The database 6 determines a sublist of list elements that corresponds to the characters in the individual character sequence. The sublist is generated based on the character sequence of the individual characters, which may include the out-of-vocabulary characters.

The second speech recognition unit 8 is configured with the second vocabulary 7. The second speech recognition unit compares the whole word stored in memory unit 8 with the sublist of list elements. The sublist is generated based on the character sequence of the individual character or the individual characters and then forwarded to the speech recognition unit which is configured with the vocabulary of the sublist. Depending on this comparison, a recognition result having the most likely list element is generated. The speech recognition system 1 provides an acoustical and/or optical transmission of a list element from the output unit 9 in response to the recognition result.

In addition, the speech recognition system 1 may have a fault tolerance to accommodate user input errors, pronunciation errors, and mix-ups resulting from unclear voice inputs. A hypothetical list of recognized and converted characters sequences of individual characters is created based on the initial character sequence. This hypothetical list contains character sequences composed of at least one individual character. Characters are taken into consideration when the characters are similar to individual characters recognized by the speech recognition unit 3 and when the characters are susceptible to mix-up.

This hypothetical list has character sequences of individual characters with at least one possible initial character of the desired list element. The hypothetical list is made available to the subsequent matching procedure by the database 6. A sublist is generated from all of the list elements based on the character sequences (i.e., a sublist of the whole list). The entire inventory of possible list elements is limited to a size that can be processed. The matching procedure is carried out by comparing the hypothetical list of recognized individual characters with the initial characters stored in the whole list. In this process, the hypothetical list of recognized individual characters is compared with the inventory of list elements in the whole list that are actually available. The hypothetical list of recognized individual characters may be faulty, but represents an error-tolerant filtering of the whole list. A fault tolerance may be required when the character sequences delivered by the speech recognition unit 3 during the separating procedure do not correspond to a correct voice input or correct speech recognition. The hypothetical list of recognized individual characters may be completed in response to the entries or list elements on the whole list. This extracted list is presented as a sublist with valid list elements. The maximum length of the extracted list (sublist) can be specified one time in the speech output, depending on the amount of data in the whole list, the properties of the speech recognition unit, and the minimum number of spoken initial characters (letters, digits, and the like) and specified in the data base as configuration parameters for the matching procedure. The sublist may have a magnitude of 500 to 1000 list elements. The sublist may have other magnitudes. A new vocabulary for the speech recognition unit is now created based on the list elements in the sublist. The speech recognition unit 3 compares the limited sublist with the whole word of the desired list element that was separated from the speech output and stored.; The result is a list element as the recognition result that most likely matches the desired list element. The recognition result is communicated optically and/or acoustically to the user by the output unit 9, which may have a display unit.

The speech recognition system 1 may be used to perform a generic subdivision of an extensive data list into smaller units (sublists) that are easier to process. Extensive data lists are lists of any size such as telephone books or geographic data lists such as place names or street names. Since two recognition procedures are carried out for the speech output (one for individual characters and the other for whole words), a high level of accuracy and reliability for the speech recognition is given, i.e., a high likelihood that the correct desired list element will be recognized. The fault tolerance in the separating procedure and the matching procedure (a two-fold fault tolerance) may compensate for input errors or inexact inputs on the part of the user. Further, the user may speak the whole word as his first voice entry and then speak the initial character or characters as the second voice entry.

Figure 2:
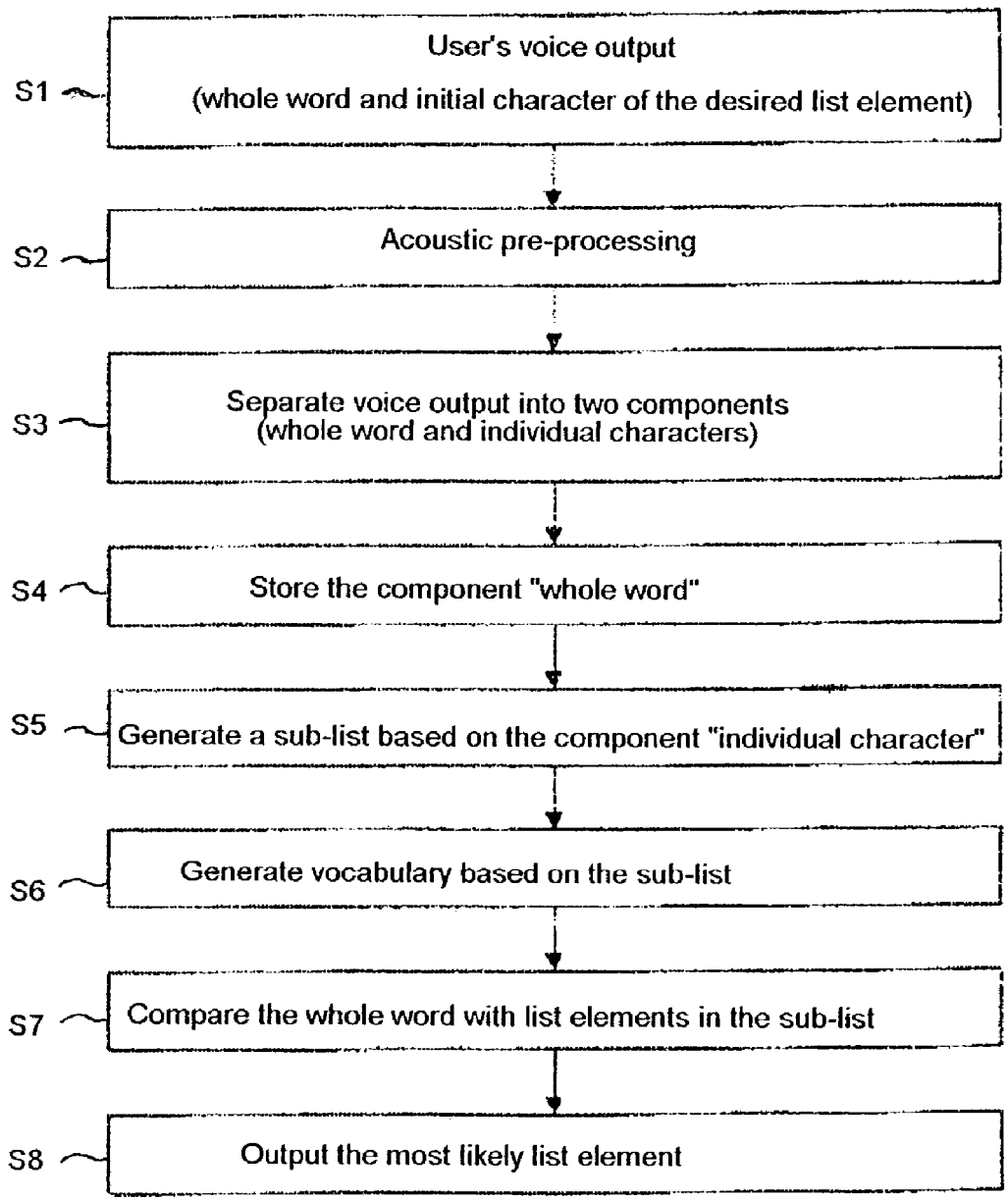
FIG. 2 is a flowchart of a method for recognizing speech to select a list element from a list of list elements.

FIG. 2 is a flowchart of a method for recognizing speech to select a list element from a list of list elements. For illustrations purposes and not as a limitation, the method is presented using "STUTTGART" as an example of a list element from a list containing place names in Germany as the list elements.

The user speaks S1 the speech output to an input unit or microphone of a speech recognition system. The speech output includes the whole word and the initial character sequence as discussed. A whole place name such as "Stuttgart" may be the whole word voice input. One or more initial characters of the place name such as "S T U T" may be the initial character sequence. The four initial letters of the place name are spoken in succession (spelled out) as individual characters.

The speech output is processed S2 acoustically in a speech recognition unit or other component of the speech recognition system. The processing reduces or eliminates disturbing environmental noises and the like.

The speech output ("Stuttgart" and "S T U T") is separated S3 in the speech recognition unit by means of the word-spotting method. The speech output is separated into the two voice inputs—"whole word" ("Stuttgart") and "individual character sequence" ("S T U T"). The speech recognition unit is configured with a first vocabulary 4 having the permitted letters, digits, and characters of the language used for the list elements. The language may be German. The speech recognition unit searches for individual characters (i.e., letters, digits, and characters) in the speech output. The first individual character recognized is the spelled-out individual letter "S". The preceding part of the speech output (i.e., the first voice input) is associated as a whole word with the out-of-vocabulary data quantity that does not belong to individual characters. The character sequence consisting of four initial characters is compiled with the individual characters following the individual character recognized as being the first (following the first individual letters). A hypothetical list of characters sequences is created, in which character sequences having similar-sounding and/or easily confused letters are contained as alternatives. The letter "S" may be confused with "F". The letter "T" may be confused with "E" or "D". As a result, the hypothetical list contains the character sequence "STUT" along with the character sequences "FDUT", "SDUT", "STOD", "STOE", SDOT", SDOD", STUD", SPUT", "SEUT", GTUT", and "ESTU".

The whole word (e.g., "Stuttgart") associated with the out-of-vocabulary data quantity is stored S4 in a memory unit as the first voice input of the speech output.

The whole list of place names (list elements) is compared S5 with the hypothetical list of character sequences delivered by the speech recognition unit. A sublist of place names is generated from this comparison. The initial letters of this sublist agree with or are similar to the character sequences of the hypothetical list. The character sequences in the hypothetical list form complete list elements (place names) contained in the whole list. List elements (place names) having similar-sounding and/or easily confused letters are also taken into account in the character sequences of the hypothetical list. The character sequences listed above are made into complete place names such as "Stuttgart", "Stotzard", "Sauggart", "Sittard", "Stutengarten", and "Stutensee." There may be about 200 place names as list elements. There may be other numbers of list elements.

The speech recognition unit or another speech recognition unit is configured S6 with this sublist of place names generated in the list comparison of the whole list with the hypothetical list. The new vocabulary may be substantially limited compared with the whole list.

In the speech recognition unit configured with the new vocabulary, the whole word ("Stuttgart") stored in the memory unit is now compared S7 with the list elements (place names) in the sublist. The place names include "Stuttgart", "Stotzarad", "Sauggart", "Sittard", "Stutengarten", "Stutensee", etc. The list element in the sublist that most likely corresponds to the whole word (e.g., "Stuttgart") is selected as the recognition result, which is the place name "Stuttgart". The selection is based on a classification carried out by the speech recognition unit.

The recognition result of the speech recognition unit ("Stuttgart") is communicated S8 to the user. The recognition result may be communicated via an acoustic output unit such as a speaker. The recognition result ("Stuttgart") may be communicated via an optical display.

While various embodiments of the invention have been described, it will be apparent to those of ordinary skill in the art that many more embodiments and implementations are possible that are within the scope of the invention.

What is claimed is:

1. A method for recognizing speech to select a list element from a list of list elements, comprising:
    stating a speech output in chronologically successive voice inputs including the whole word of a desired list element as well as at least one initial character of the desired list element, wherein both the whole word and the at least one initial character are stated for every desired list element;
    separating the speech output into whole word and individual character sequence components;
    processing separately the whole word and individual character sequence components; and
    performing speech recognition configured for the whole word in response to the individual character sequence.

2. The method according to claim 1, further comprising:
    storing the whole word of the desired list element that was separated as a component of the speech output;
    generating a sublist of the list elements from the list of list elements based on the individual character sequence component filtered out of the speech output;
    comparing the list elements of the sublist with the stored whole word of the desired list element in the speech recognition of the two processed components of the speech output; and
    generating a recognition result in response to the comparison of the list elements, where the recognition result is the list element most likely to match the desired list element.

3. The method according to claim 1, further comprising separating the speech output into the whole word and individual character components by means of speech recognition of individual characters.

4. The method according to claim 3, further comprising storing the portion of the speech output not associated with the individual character sequence as a whole word.

5. The method according to claim 1, where the two voice inputs of the speech output take place in chronological succession.

6. The method according to claim 5, where the two voice inputs of the speech output take place in chronological succession separated by a pause.

7. The method according to claim 1, the first voice input is the whole word of the desired list element, and the second voice input is at least one initial character of the desired list element.

8. The method according to claim 1, where the first voice input to be spoken is at least one initial character of the desired list element, and the second voice input to be spoken is the whole word of the desired list element.

9. The method according to claim 1, further comprising transmitting the list element most likely to match the desired list element as the recognition result.

10. The method according to claim 9, further comprising transmitting the list element acoustically.

11. The method according to claim 9, further comprising transmitting the list element optically.

12. The method according to claim 1, further comprising:
   matching a hypothetical list with the list of list elements, the hypothetical list having a character sequence comprising at least one possible initial character of the desired list element; and generating a sublist.

13. The method according to claim 12, further comprising:
   filtering the desired list element out of the speech output; and
   forming the character sequences of the hypothetical list from the component individual character sequences of the desired list element and from characters that are similar to the filtered-out individual characters.

14. The method according to claim 12, further comprising appending the character sequences of the hypothetical list to the list elements contained in the whole list.

15. The method according to claim 1 implemented in one of a destination guidance system and a navigation system.

16. A speech recognition system, comprising:
   an input unit for voice input of a speech output comprising a whole word of a desired list element and at least one initial character of the desired list element, wherein both the whole word and the at least one initial character are stated for every desired list element;
   a speech recognition unit for separating the speech output into whole word and individual character components and processing separately the whole word and individual character sequence components;
   a memory unit for storing the whole word;
   a database comprising a list of list elements for creating a sublist based on the match with the individual character;
   a speech recognition unit configured with vocabulary created based on the list elements of the sublist for comparing the stored whole word of the desired list element with the list elements of the sublist; and
   an output unit for transmitting the list element evaluated as being the most likely desired list element.

17. A method for recognizing speech to select a list element from a list of list elements, comprising:
   separating a speech output into a whole word and individual character sequence components, wherein both the whole word and at least one initial character are stated for every speech output; processing separately the whole word and the individual character sequence components;
   storing the whole word;
   generating a sublist in response to the individual character sequence; and
   outputting a list element responsive to the whole word and the sublist.

18. The method according to claim 17, where the whole word and individual character sequence are chronologically successive voice inputs.

19. The method according to claim 18, where the whole word and individual character sequence are chronologically successive voice inputs separated by a pause.

20. The method according to claim 18, where the initial character sequence is the first voice input chronologically.

21. The method according to claim 18, where the whole word is the first voice input chronologically.

22. The method according to claim 17, further comprising where the individual character sequence comprises one initial character of the list element.

23. The method according to claim 17, further comprising where the individual character sequence comprises four initial characters of the list element.

24. The method according to claim 17, further comprising transmitting the list element acoustically.

25. The method according to claim 17, further comprising transmitting the list element optically.

26. The method according to claim 17, further comprising matching a hypothetical list with the sublist, the hypothetical list having a character sequence comprising at least the initial character of the list element.

* * * * *

UNITED STATES PATENT AND TRADEMARK OFFICE
CERTIFICATE OF CORRECTION

PATENT NO.         : 7,392,182 B2
APPLICATION NO.    : 10/324737
DATED              : June 24, 2008
INVENTOR(S)        : Gerhard Nuessle et al.

It is certified that error appears in the above-identified patent and that said Letters Patent is hereby corrected as shown below:

In column 7, in claim 13, line 5, delete "component individual character sequences" and substitute --individual character sequence component-- in its place.

In column 7, in claim 14, line 2, after "elements contained in" delete "the" and substitute --a-- in its place.

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 7,392,182 B2  Page 1 of 1
APPLICATION NO. : 10/324737
DATED : June 24, 2008
INVENTOR(S) : Gerhard Nuessle et al.

It is certified that error appears in the above-identified patent and that said Letters Patent is hereby corrected as shown below:

In column 7, in claim 13, line 20, delete "component individual character sequences" and substitute --individual character sequence component-- in its place.

In column 7, in claim 14, line 24, after "elements contained in" delete "the" and substitute --a-- in its place.

This certificate supersedes the Certificate of Correction issued January 6, 2009.

Signed and Sealed this

Third Day of February, 2009

JOHN DOLL
*Acting Director of the United States Patent and Trademark Office*